United States Patent [19]

Oerter

[11] Patent Number: 5,080,157

[45] Date of Patent: Jan. 14, 1992

[54] SEAL FOR USE BETWEEN RELATIVELY ROTATING MEMBERS

[75] Inventor: Johann-Georg Oerter, Munich, Fed. Rep. of Germany

[73] Assignee: Man Nutzfahrzeuge Ag, Munich, Fed. Rep. of Germany

[21] Appl. No.: 492,208

[22] Filed: Mar. 12, 1990

Related U.S. Application Data

[63] Continuation of Ser. No. 231,098, Aug. 11, 1988, abandoned, which is a continuation of Ser. No. 911,406, Sep. 25, 1986, abandoned.

[30] Foreign Application Priority Data

Dec. 4, 1985 [DE] Fed. Rep. of Germany ....... 3542841

[51] Int. Cl.$^5$ ............... B60C 23/00; F16C 33/78; F16C 33/80; F16J 15/32
[52] U.S. Cl. ................. 152/417; 277/35; 277/56; 277/72 R; 277/79; 277/153; 384/480; 384/484
[58] Field of Search ............. 277/35, 56, 72 R, 53, 277/79, 55, 153; 384/480, 484; 152/417

[56] References Cited

U.S. PATENT DOCUMENTS

| 1,720,703 | 7/1929 | Sunleaf | 384/480 |
| 1,722,489 | 7/1929 | Bott | 384/480 |
| 1,991,077 | 2/1935 | Brittain, Jr. | 384/480 |
| 2,785,024 | 3/1957 | Meisel et al. | 384/484 |
| 3,207,521 | 9/1965 | Dega | 277/58 |
| 3,320,006 | 5/1967 | Cozzarin | 384/147 |
| 3,362,452 | 1/1968 | Harnish | 152/416 |
| 3,705,614 | 12/1972 | Juttner et al. | 152/417 |
| 4,153,258 | 5/1979 | Huber et al. | 277/56 |
| 4,210,405 | 7/1980 | Jesswein | 277/29 X |
| 4,431,043 | 2/1984 | Goodell et al. | 152/417 |
| 4,498,709 | 2/1985 | Wells et al. | 152/417 X |
| 4,645,362 | 2/1987 | Orte | 277/65 |

FOREIGN PATENT DOCUMENTS

| 389120 | 3/1921 | Fed. Rep. of Germany | 277/53 |
| 615333 | 1/1961 | Italy | 152/417 |
| 153576 | 2/1956 | Sweden | 384/480 |
| 249210 | 1/1970 | U.S.S.R. | 152/417 |
| 566812 | 1/1945 | United Kingdom | 277/56 |

*Primary Examiner*—Allan N. Shoap
*Attorney, Agent, or Firm*—Ladas & Parry

[57] ABSTRACT

The invention relates to a system for the supply of compressed air to the tire of a commercial vehicle by way of a duct system leading through a non-rotary first member into an annular space and then into a rotary second member. The annular space is formed between a receiving sleeve in the rotary member and a race ring on the non-rotary member and is delimited by axially spaced, coaxial seals which may be shaft labyrinth seals or seals making sliding contact.

11 Claims, 2 Drawing Sheets

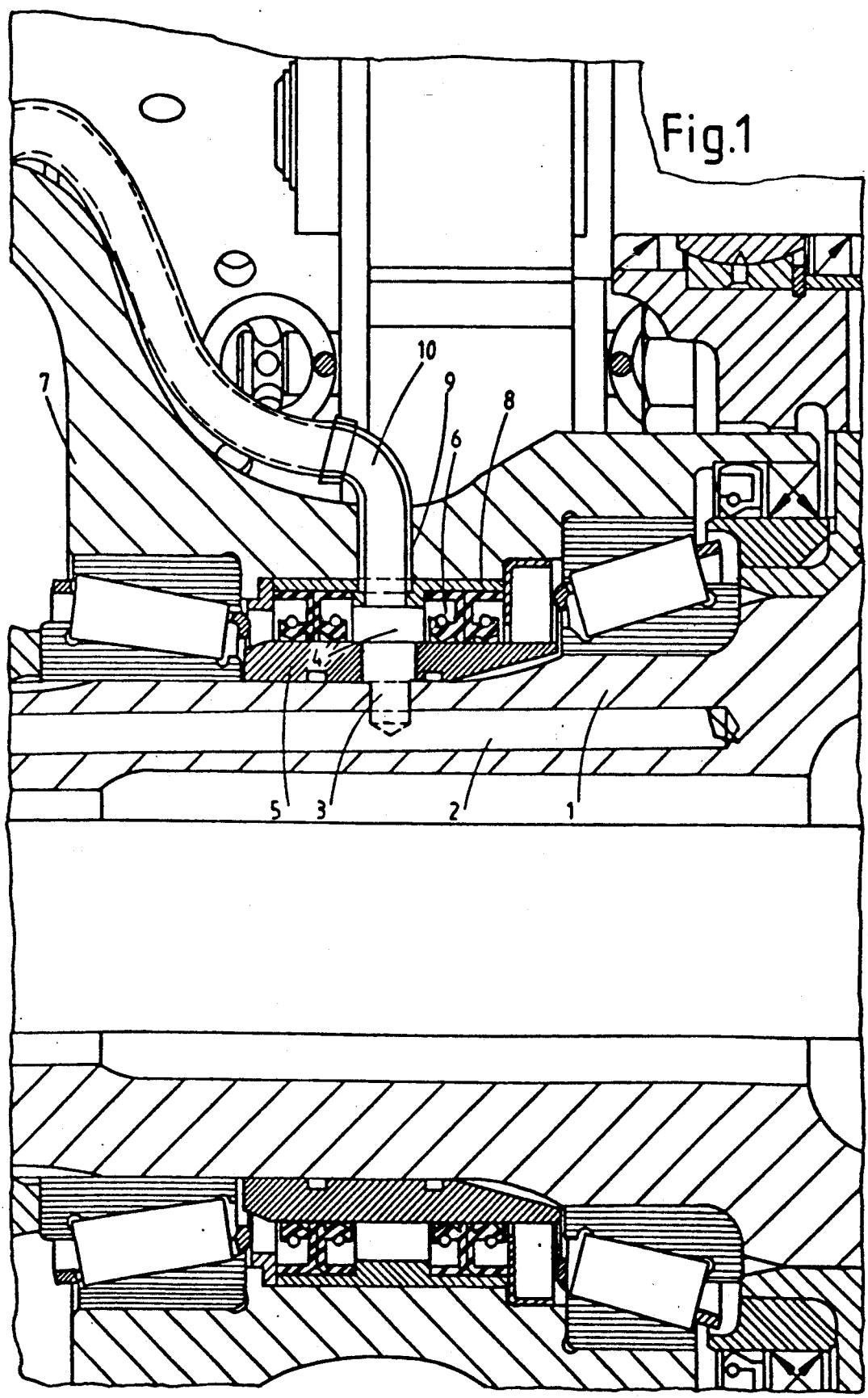

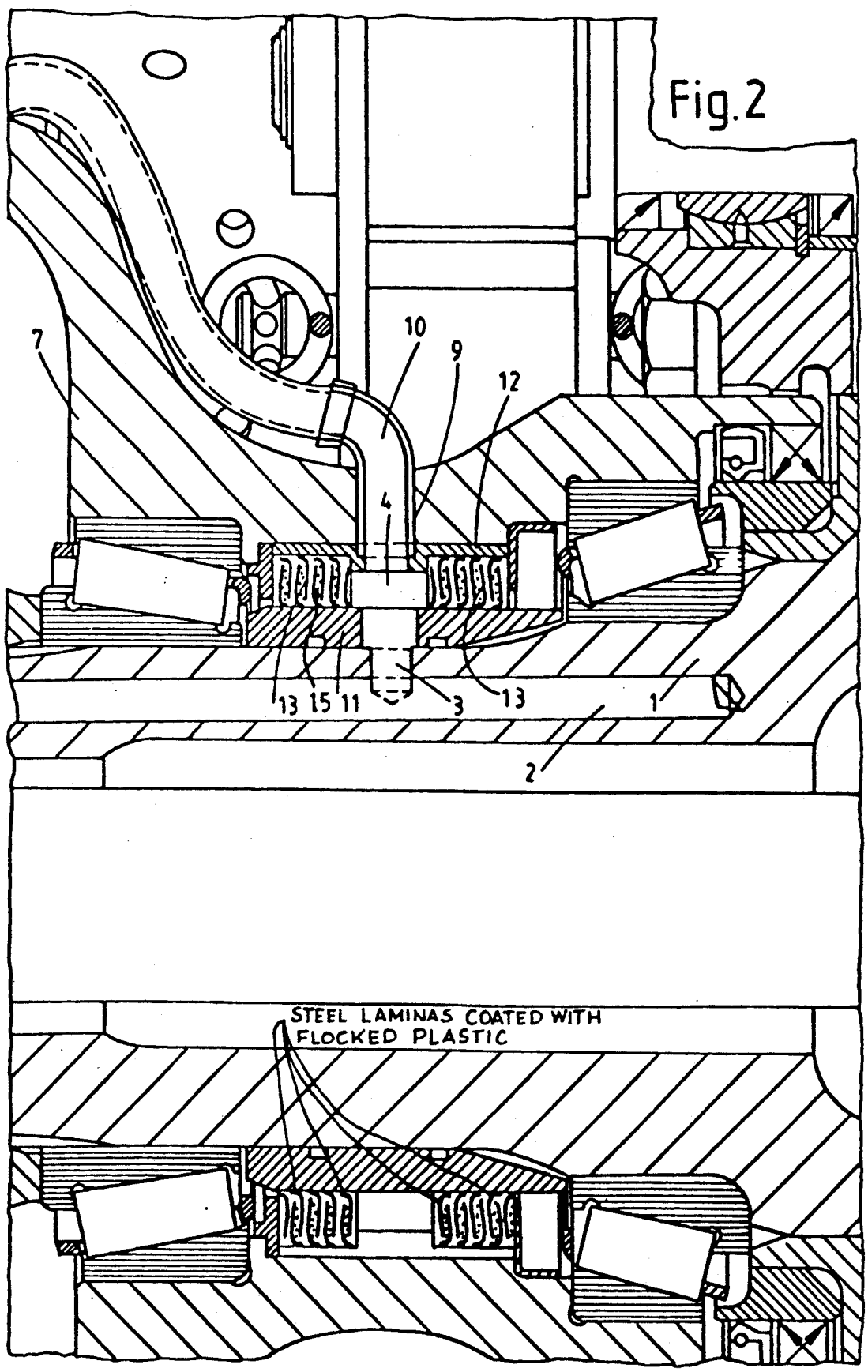

SEAL FOR USE BETWEEN RELATIVELY ROTATING MEMBERS

This is a continuation of application Ser. No. 07/231,098, filed on Aug. 11, 1988, now abandoned, and which is a continuation of application Ser. No. 06/911,406, filed on Sept. 25, 1986, now abandoned.

BACKGROUND OF THE INVENTION (A) Field of the Invention

The invention relates to a seal arrangement as part of a duct system for supplying compressed air to a tire on a commercial vehicle wheel from a first, non-rotary member to a second member designed to rotate with the said wheel. The duct system includes an annular space between the two said members and seal means for preventing the ingress of lubricant into the said space.

(B) Description of Prior Art

A large number of different air supply or tire pressure controlling systems of this type have been proposed so far and an example is to be seen in the U.S. Pat. No. 3,705,614. A shortcoming of the known designs is however the great trouble and expense involved in the precision machining of the large-sized parts of the non-rotary member, herein referred to as the hub, and the rotary second member herein referred to as the hub housing, with the particular necessity of accurately grinding the face on which the lips of the seal rings bear. On the one hand such machining is only possible with large machine tools and on the other it is possible for the ground running faces to be damaged during later shipment.

SUMMARY OF THE PRESENT INVENTION

One object of the present invention is to generally improve the sealing system for the annular space between the two members.

A further object of the invention is to bring about an improvement such that the sealing system is unlikely to suffer damage.

A further objective of the invention is to produce such a sealing system that is readily fitted.

In order to achieve these or other objects appearing in the course of the present specification and claims the seal means are arranged in a receiving sleeve adapted to be connected with the second member or hub housing and the first member or wheel hub possesses a race ring connected therewith offering a contact surface for the lips of the seal means. An advantage is that the stack of seal elements, consisting of the receiving sleeve and at least two seals as, for example, shaft seal rings, may be made ready even during the course of pre-assembly as a unit that only has to be inserted into the hub housing with a force fit. It is particularly convenient if a race ring, which is protected by a suitable packing until the time comes to fit it, is able to be drawn onto the hub so that there is an unscathed running surface ready to have the seal rings assembled directly on it.

In accordance with another, alternative form of the invention, it is possible to have labryrinth seals to seal off the space between sleeve in the hub housing and race ring on the hub. In this respect it is a question of a contactless seal so that there is a durable sealing action for the annular space which may be maintained without servicing. The effect may be even further enhanced if the lamellas of the labyrinth seal made of steel are coated with plastic by flocking so that there is an extremely low coefficient of friction. The coefficient of friction may be still further reduced by filling with lithium or calcium soap so that there is the simultaneous effect of sealing off the annular space for the compressed air that it is not possible for any oil from the oil filled spaces to work its way into it.

Further advantages and features of the invention are to be seen from the claims, the specification and the drawings.

A description will now be given of one embodiment of the invention with a possible modification with reference to the accompanying drawings.

BRIEF DESCRIPTION OF THE SEVERAL VIEWS OF THE DRAWINGS

FIG. 1 is a partial section of the sealed annular space between the wheel hub and the wheel hub housing.

FIG. 2 is a partial section of the sealed annular space between the wheel hub and the wheel hub housing in a modified form of the invention.

DETAILED DESCRIPTION OF THE INVENTION

FIG. 1 shows a tire pressure control system, whose supply duct from a pump to the tire is via a duct section 2, and a further duct section 3 in a first stationary member, herein referred to as the wheel hub 1, leading into an annular space 4, which is formed between a race ring 5 drawn onto the said hub so as to be firmly secured thereto, and a receiving sleeve 8 slid into a rotary second member 7 (herein referred to as the hub housing) and firmly united therewith. The annular space is also bounded by seals 6, for example, shaft seals making sliding contact. In a hole 9 in the rotary wheel hub housing 7 there is a tube 10 which is firmly located in place so as to be in communication with the annular space 4, the end of the tube 10 being seated in a recess in receiving sleeve 8. Compressed air may be supplied to the tire on the wheel of the vehicle via tube 10 and further tubes which are not shown in the drawing.

FIG. 2 shows a somewhat modified form of the invention or further embodiment. The supply of air is, as in FIG. 1, into the annular space 4. The annular space 4 is bounded by labyrinth seals 13 arranged in sleeves 11 and 12. The seal lamellas or washers are made of pressed steel sheet with a flocked surface and in order to facilitate mounting them on the race ring, the latter is chamfered at its left hand end as a sort of ramp. The cavities between the lamellas are filled with lithium or calcium soap 15. At its right end the inner surface of the race ring 5 is chamfered which facilitates the drawing of the race ring onto the hub.

It is naturally possible to have a combination of labyrinth seals and shaft seals.

What is claimed is:

1. In a duct system for supplying compressed air to a tire on a commercial vehicle wheel from a first, non-rotary member to a second member which rotates with the wheel, the first member having a hub with spaced bearings on the hub supporting the second member to permit rotation of the second member, the improvement comprising a sealing arrangement disposed between the bearings and positioned between the first and second members to cooperate in the duct system for supply of compressed air to the tire, said sealing arrangement including a cylindrical outer receiving sleeve adapted to be fitted in said second member, a race ring adapted to be fitted on said first member between said bearings and within said sleeve, said race ring having an outer cylindrical surface facing the cylindrical sleeve to form an annular space between the race ring and said sleeve, and a pair of annular seal means coaxially arranged and axially spaced from one another between said race ring and said sleeve, said seal means including means providing rotational, sealed engagement between said race ring and said sleeve to define and seal said annular space therebetween, said race ring being relatively thick compared to said outer receiving sleeve, said race ring being force fit on said hub, said cylindrical receiving sleeve being mounted within an inner surface of said second member on said outer cylindrical surface of said race ring such that upon assembly said receiving sleeve is force fit in said inner surface of said second member, said seal means including portions in contact with the inner surface of the cylindrical receiving sleeve and the outer cylindrical surface of the race ring to provide sealing engagement therebetween.

2. The sealing arrangement as claimed in claim 1 wherein said race ring and said sleeve are positively held in place.

3. The sealing arrangement as claimed in claim 1 wherein each of said seal means comprises an annular seal.

4. The sealing arrangement as claimed in claim 1 wherein each of said seal means comprises a plurality of labyrinth seals.

5. The sealing arrangement as claimed in claim 4 wherein said labyrinth seals comprise pressed steel lamellas coated with flocked plastic.

6. The sealing arrangement as claimed in claim 4 wherein said labyrinth seals are filled with lithium soap.

7. The sealing arrangement as claimed in claim 4 wherein said labyrinth seals are filled with calcium soap.

8. The sealing arrangement as claimed in claim 1 comprising a tube fixed in said second member and in communication with said annular space, said second member having a hole therein extending to said inner surface of said second member, said tube being fixed in said hole and having an end engaged in said receiving sleeve.

9. The sealing arrangement as claimed in claim 1 wherein said race ring has an inner surface with a chamfer facing the surface of the first member.

10. The sealing arrangement as claimed in claim 1 wherein said cylindrical receiving sleeve and said seal means are mounted as a pre-assembled unit.

11. The sealing arrangement as claimed in claim 1 wherein said race ring has a chamfered end which enables the seal means to ride on the race ring when the pre-assembled unit is engaged on the race ring.

* * * * *

UNITED STATES PATENT AND TRADEMARK OFFICE
CERTIFICATE OF CORRECTION

PATENT NO. : 5,080,157
DATED : January 14, 1992
INVENTOR(S) : Johann-Georg OERTER It is certified that error appears in the above-identified patent and that said Letters Patent is hereby corrected as shown below:

Title page, Item 73 - Correct the printing of the Assignee name from:

"Man Nutzfahrzeuge Ag., Munich" to

"MAN Nutzfahrzeuge AG, Munich".

Signed and Sealed this

Twenty-fifth Day of May, 1993

Attest:

MICHAEL K. KIRK

Attesting Officer

Acting Commissioner of Patents and Trademarks